United States Patent
Goldacker et al.

(10) Patent No.: US 7,683,131 B2
(45) Date of Patent: *Mar. 23, 2010

(54) MOLDING MATERIAL CONTAINING A MATTING AGENT

(75) Inventors: Thorsten Goldacker, Wiesbaden (DE); Andreas Spiess, Dieburg (DE); Reiner Mueller, Biebesheim (DE); Klaus Schultes, Wiesbaden (DE); Uwe Numrich, Gross-Zimmern (DE)

(73) Assignee: Röhm GmbH & Co. KG, Darmstadt (DE)

( * ) Notice: Subject to any disclaimer, the term of this patent is extended or adjusted under 35 U.S.C. 154(b) by 839 days.

This patent is subject to a terminal disclaimer.

(21) Appl. No.: 10/579,843

(22) PCT Filed: Sep. 15, 2004

(86) PCT No.: PCT/EP2004/010299

§ 371 (c)(1),
(2), (4) Date: May 17, 2006

(87) PCT Pub. No.: WO2005/052038

PCT Pub. Date: Jun. 9, 2005

(65) Prior Publication Data

US 2007/0066708 A1    Mar. 22, 2007

(30) Foreign Application Priority Data

Nov. 20, 2003  (DE) ................ 103 54 379

(51) Int. Cl.
C08J 5/18      (2006.01)
C08L 33/12     (2006.01)
C08L 51/00     (2006.01)
C08L 101/00    (2006.01)
C08L 33/00     (2006.01)
C08F 265/04    (2006.01)
C08F 265/06    (2006.01)

(52) U.S. Cl. .............. 525/211; 525/228; 525/232; 525/238; 525/240; 525/241

(58) Field of Classification Search ............. 525/211, 525/228, 232, 238, 240, 241
See application file for complete search history.

(56) References Cited

U.S. PATENT DOCUMENTS

| | | | |
|---|---|---|---|
| 4,186,120 A | 1/1980 | Ugelstad | |
| 4,833,221 A | 5/1989 | Albrecht | |
| 5,110,877 A | 5/1992 | Hoess et al. | |
| 5,155,172 A | 10/1992 | Siol et al. | |
| 5,219,931 A | 6/1993 | Siol et al. | |
| 5,270,397 A | 12/1993 | Rhein et al. | |
| 5,280,073 A | 1/1994 | Siol et al. | |
| 5,548,033 A | 8/1996 | Vetter et al. | |
| 5,652,316 A | 7/1997 | May et al. | |
| 5,705,189 A | 1/1998 | Lehmann et al. | |
| 6,040,387 A | 3/2000 | Albrecht et al. | |
| 6,287,470 B1 | 9/2001 | Vetter et al. | |
| 6,355,712 B1 | 3/2002 | Schultes et al. | |
| 6,576,255 B1 | 6/2003 | Petereit et al. | |
| 6,613,871 B2 | 9/2003 | Hoess et al. | |
| 6,765,046 B1 | 7/2004 | Numrich et al. | |
| 6,803,416 B2 | 10/2004 | Schultes et al. | |
| 6,809,163 B2 | 10/2004 | Schultes et al. | |
| 6,841,612 B1* | 1/2005 | Yang et al. ............. 524/523 |
| 6,890,993 B2 | 5/2005 | Schultes et al. | |
| 6,998,140 B2 | 2/2006 | Meier et al. | |
| 7,046,952 B2 | 5/2006 | Kurotori et al. | |
| 7,067,188 B1* | 6/2006 | Yang et al. ............. 428/327 |
| 7,179,852 B2 | 2/2007 | Schultes et al. | |
| 2002/0160042 A1 | 10/2002 | Petereit et al. | |
| 2003/0031847 A1 | 2/2003 | Numrich et al. | |

(Continued)

FOREIGN PATENT DOCUMENTS

EP    0 342 283    11/1989

(Continued)

OTHER PUBLICATIONS

U.S. Appl. No. 12/300,408, filed Nov. 11, 2008, Hoess, et al.

(Continued)

*Primary Examiner*—Nathan M Nutter
(74) *Attorney, Agent, or Firm*—Oblon, Spivak, McClelland, Maier & Neustadt, L.L.P.

(57) ABSTRACT

The invention relates to a moulding composition, comprising a) 50 to 99.9% by weight of a matrix composed of a thermoplastic polymer and b) from 0.1 to 50% by weight of a matting agent in the form of a (meth)acrylate copolymer dispersed in the matrix, characterized in that the matting agent is a (meth)acrylate copolymer which has been prepared from the following monomers, b1) from 50 to 95% by weight of methyl methacrylate
b2) from 5 to 50% by weight of $C_1$-$C_6$-alkyl acrylates
b3) from 0.01 to less than 0.5% by weight of a crosslinking monomer and/or graft-linking agent having two or more ethylenically unsaturated radicals capable of free-radical polymerization,
b4) from 0 to 20% by weight of one or more other, non-crosslinking ethylenically unsaturated monomers capable of free-radical polymerization, where the entirety of the constituents b1) and b2) and, where appropriate, b3) and/or b4) gives 100% by weight, and the glass transition temperature $T_{mg}$ of the matting agent is at least 20° C.

13 Claims, No Drawings

U.S. PATENT DOCUMENTS

| | | |
|---|---|---|
| 2004/0104501 A1 | 6/2004 | Petereit et al. |
| 2004/0116567 A1 | 6/2004 | Schmitt et al. |
| 2005/0065224 A1 | 3/2005 | Menzler et al. |
| 2005/0080188 A1 | 4/2005 | Schultes et al. |
| 2005/0152977 A1 | 7/2005 | Petereit et al. |
| 2005/0164007 A1 | 7/2005 | Numrich et al. |
| 2005/0267250 A1 | 12/2005 | Theil et al. |
| 2006/0052515 A1 | 3/2006 | Schultes et al. |
| 2006/0121248 A1 | 6/2006 | Lorenz et al. |
| 2006/0147714 A1 | 7/2006 | Schultes et al. |
| 2006/0175735 A1 | 8/2006 | Hoess et al. |
| 2007/0055017 A1 * | 3/2007 | Schultes et al. ............ 525/101 |
| 2007/0112135 A1 | 5/2007 | Wicker et al. |
| 2007/0122624 A1 | 5/2007 | Schultes et al. |
| 2007/0123610 A1 | 5/2007 | Schultes et al. |
| 2007/0185270 A1 | 8/2007 | Arndt et al. |
| 2007/0197703 A1 | 8/2007 | Neuhäuser et al. |
| 2007/0222117 A1 | 9/2007 | Hoess et al. |
| 2007/0276093 A1 | 11/2007 | Schultes et al. |
| 2008/0242782 A1 | 10/2008 | Hager et al. |

FOREIGN PATENT DOCUMENTS

| | | |
|---|---|---|
| EP | 0 528 196 | 2/1993 |

OTHER PUBLICATIONS

U.S. Appl. No. 11/816,130, filed Aug. 13, 2007, Numrich, et al.
U.S. Appl. No. 10/570,194, filed Mar. 2, 2006, Numrich, et al.
U.S. Appl. No. 11/721,979, filed Jun. 16, 2007, Goldacker, et al.
U.S. Appl. No. 11/814,704, filed Jul. 25, 2007, Neuhaeuser, et al.
U.S. Appl. No. 11/748,874, filed May 15, 2007, Schultes, et al.
U.S. Appl. No. 11/720,653, filed Jun. 1, 2007, Schultes, et al.
U.S. Appl. No. 11/813,946, filed Jul. 13, 2007, Schultes, et al.
U.S. Appl. No. 11/817,407, filed Aug. 30, 2007, Hoess, et al.
U.S. Appl. No. 11/913,325, filed Nov. 1, 2007, Schwartz-Barac, et al.
U.S. Appl. No. 60/831,222, filed Jul. 17, 2006, Hager, et al.
U.S. Appl. No. 10/544,805, filed Aug. 8, 2005, Goldacker, et al.
U.S. Appl. No. 11/970,190, filed Jan. 7, 2008, Schultes, et al.
U.S. Appl. No. 12/094,277, filed May 20, 2008, Schultes, et al.
U.S. Appl. No. 12/521,004, filed Jun. 24, 2009, Schultes, et al.
U.S. Appl. No. 12/525,160, filed Jul. 30, 2009, Schultes, et al.
U.S. Appl. No. 12/436,809, filed May 7, 2009, Schultes, et al.

* cited by examiner

MOLDING MATERIAL CONTAINING A MATTING AGENT

The invention relates to a moulding composition, comprising a matting agent. The invention further relates to mouldings produced from the moulding composition, and also to uses of the same.

PRIOR ART

EP 0 342 283 A1 describes thermoplastic polymer compositions composed of a thermoplastic matrix polymer, comprising multilayer matting agents with a core composed of crosslinked acrylate rubber and with an outer shell which is compatible with the matrix.

Matting agents according to EP 0 342 283 A1 have a comparatively soft core with the result that the matt structure, which is composed of the particles protruding from the surface, is very soft and does not have particularly good abrasion resistance. In addition, the polymerization to apply the shell, which is needed for linking to the matrix, adds another step in the process which is difficult specifically in the case of the large latex particles present here and often leads to undesired formation of new particles. The core particles themselves are prepared in the patent application via a multistage swelling process according to U.S. Pat. No. 4,186,120. Here, a monomer diffuses through the aqueous phase into the latex particles and swells them by a factor of four times their initial volume. An oil-soluble initiator is then allowed to diffuse into the material, and initiates the polymerization. A disadvantage of this process is that a significant enlargement of the particles requires large amounts of monomer which have to diffuse into the particles. This process is very slow and generally incomplete, and the remaining monomer therefore leads to considerable amounts of coagulated material during the subsequent polymerization.

EP 0 528 196 A1 describes matt films which can comprise matting agents composed of a thermoelastic polymer, composed of:
b1) from 50 to 99.5% by weight (based on B) of a, where appropriate branched or cyclic, $C_1$-$C_6$-alkyl methacrylate
b2) from 0.5 to 10% by weight of a crosslinking monomer having two or more ethylenically unsaturated groups capable of free-radical polymerization, and
b3) where appropriate, other ethylenically unsaturated monomers capable of free-radical polymerization.

By way of example, matting agents whose diameter is about 3 μm composed of equal parts of methyl methacrylate and isobutyl methacrylate which are cross-linked with 5% of glycol dimethacrylate are admixed at 20% by weight with an impact-modified matrix composed of polymethyl methacrylate. For films which, by way of example, were produced according to EP 0 528 196 A1, surface roughnesses to DIN 4768 are given with roughness values $R_a$=0.3 μm, $R_z$=1.7 μm and $R_{max}$=2.2 μm.

Moulding compositions which have been prepared according to EP 0 528 196 A1 are observed to have relatively poor thermal stability during the subsequent thermoplastic processing.

OBJECT AND ACHIEVEMENT OF OBJECT

There is a need for moulding compositions which are suitable for the production of matt mouldings, in particular films. Starting from EP 0 342 283 A1 and EP 0 528 196 A1, the object was regarded as providing a moulding composition from which it is possible to produce matt mouldings, in particular films, which have a silken-matt surface with pleasant feel. The matting agent is also intended to have a comparatively simple structure and to be capable of easy preparation, and to result in no, or at most no substantial, impairment of corresponding moulding compositions and of the abrasion resistance of mouldings produced therefrom.

The object is achieved by way of a moulding composition, comprising
a) from 50 to 99.9% by weight of a matrix composed of a thermoplastic polymer and
b) from 0.1 to 50% by weight of a matting agent in the form of a (meth)acrylate copolymer dispersed in the matrix, characterized in that
the matting agent is a (meth)acrylate copolymer which has been prepared from the following monomers:
b1) from 50 to 95% by weight of methyl methacrylate
b2) from 5 to 50% by weight of $C_1$-$C_6$-alkyl acrylates
b3) from 0.01 to less than 0.5% by weight of a crosslinking monomer and/or graft-linking agent having two or more ethylenically unsaturated radicals capable of free-radical polymerization,
b4) from 0 to 20% by weight of one or more other, non-crosslinking ethylenically unsaturated monomers capable of free-radical polymerization, where the entirety of the constituents b1) and b2) and, where appropriate, b3) and/or b4) gives 100% by weight, and the glass transition temperature $T_{mg}$ of the matting agent is at least 20° C.

The inventive moulding composition comprises a (meth)acrylate-based matting agent whose relative level of crosslinking is only very low. The matting agent is preferably prepared without regulation, its molecular weight therefore being comparatively high, even in the non-crosslinked state. Electron micrographs show that the matting agent looses its initial spherical shape in the polymer matrix and appears elongate and ellipsoid. The matting agent here appears at least to some extent to have been dissolved in the thermoplastic matrix or has swollen into this matrix. In contrast to prior-art matting agents with a relatively high level of crosslinking, which almost retain a spherical shape in the polymer matrix and thus bring about a coarse matt effect, the inventive moulding composition gives mouldings with a very fine silken-matt surface structure. In addition to this, mechanical properties, e.g. tensile strength or tear-propagation resistance, are improved. People tested for feel of the surfaces found it to be extremely pleasant.

DESCRIPTION OF THE INVENTION

The invention relates to a moulding composition, comprising
a) from 50 to 99.9% by weight, preferably from 75 to 95% by weight, in particular from 80 to 90% by weight, of a matrix composed of a thermoplastic polymer and
b) from 0.1 to 50% by weight, preferably from to 5 to 25% by weight, in particular from 10 to 20% by weight, of a matting agent in the form of a (meth)acrylate copolymer dispersed in the matrix.

The Matrix a)

The matrix a) may be composed of a polymethyl methacrylate, of an impact-modified polymethyl methacrylate, of a polycarbonate, of a polystyrene, of an acrylate-styrene-acrylonitrile graft copolymer (ASA), of a styrene-acrylonitrile (SAN), of a polyester, of a polyethylene terephthalate (PET), of a glycol-modified polyethylene terephthalate (PETG), of a polybutylene terephthalate plastic (PBT), of a polyvinyl chloride plastic (PVC), of a polyolefin plastic, of a cycloolefin copolymer (COC), of an acrylonitrile-butadiene-styrene (ABS) or of a mixture (blend) of various thermoplastics.

Preference is given to polymethyl methacrylates or impact-modified polymethyl methacrylate plastics.

Polymethyl Methacrylate Plastics

Polymethyl methacrylate plastics are homopolymers or copolymers composed of at least 80% by weight of methyl methacrylate and, where appropriate, up to 20% by weight of other monomers copolymerizable with methyl methacrylate. Polymethyl methacrylate plastics are in particular composed of from 80 to 100% by weight, preferably from 90 to 99.5% by weight, of free-radical-polymerized methyl methacrylate units and, where appropriate, from 0 to 20% by weight, preferably from 0.5 to 10% by weight, of other comonomers capable of free-radical polymerization, e.g. $C_1$-$C_4$-alkyl (meth)-acrylate, in particular methyl acrylate, ethyl acrylate or butyl acrylate. The average molar mass $M_w$ (weight-average) of the matrix is preferably in the range from 90 000 to 200 000 g/mol, in particular from 100 000 to 150 000 g/mol (determined by means of gel permeation chromatography with reference to polymethyl methacrylate as calibration standard). By way of example, the molar mass $M_w$ may be determined gel permeation chromatography or by a light scattering method (see, for example, B. H. F. Mark et al., Encyclopaedia of Polymer Science and Engineering, 2nd Edition, Vol. 10, pp. 1 et seq., J. Wiley, 1989).

Preference is given to a copolymer composed of from 90 to 99.5% by weight of methyl methacrylate and from 0.5 to 10% by weight of methyl acrylate. The Vicat softening points VSP (ISO 306-B50) may be in the range at least 90° C., preferably 95-112° C.

Impact Modifiers for Polymethyl Methacrylates

The matrix a) may be an impact-modified polymethyl methacrylate which comprises an impact modifier whose structure has two or three layers.

Impact modifiers for polymethacrylate plastics are well known. By way of example, EP-A 0 113 924, EP-A 0 522 351, EP-A 0 465 049 and EP-A 0 683 028 describe the preparation and structure of impact-modified polymethacrylate moulding compositions.

Polymethacrylate Matrix

From 70 to 99% by weight of the impact-resistant moulding composition is composed of a matrix which is composed of from 80 to 100% by weight, preferably from 90 to 98% by weight, of free-radical-polymerized methyl methacrylate units and, where appropriate, of from 0 to 20% by weight, preferably from 2 to 10% by weight, of other comonomers capable of free-radical polymerization, e.g. $C_1$-$C_4$-alkyl (meth)acrylates, in particular methyl acrylate, ethyl acrylate or butyl methacrylate. The average molar mass $M_w$ of the matrix is preferably in the range from 90 000 to 200 000 g/mol, in particular from 100 000 to 150 000 g/mol.

Impact Modifiers

From 1 to 30% by weight, preferably from 2 to 20% by weight, particularly preferably from 3 to 15% by weight, in particular from 5 to 12% by weight, of an impact modifier which is an elastomer phase composed of crosslinked polymer particles is present in the polymethacrylate matrix. The impact modifier is obtained in a manner known per se via bead polymerization or via emulsion polymerization.

In the simplest case the material comprises crosslinked particles obtainable by means of bead polymerization with a median particle size in the range from 50 to 500 µm, preferably from 80 to 120 µm. These are generally composed of 40% by weight, preferably from 50 to 70% by weight, of methyl methacrylate, from 20 to 40% by weight, preferably from 25 to 35% by weight, of butyl acrylate, and from 0.1 to 2% by weight, preferably from 0.5 to 1% by weight, of a crosslinking monomer, e.g. of a polyfunctional (meth)acrylate, e.g. allyl methacrylate and, where appropriate, of other monomers, e.g. from 0 to 10% by weight, preferably from 0.5 to 5% by weight, of $C_1$-$C_4$-alkyl methacrylates, such as ethyl acrylate or butyl methacrylate, preferably methyl acrylate, or of other monomers capable of vinylic polymerization, e.g. styrene.

Preferred impact modifiers are polymer particles whose core-shell structure has two layers, particularly preferably has three layers, and which can be obtained via emulsion polymerization (see, for example, EP-A 0 113 924, EP-A 0 522 351, EP-A 0 465 049 and EP-A 0 683 028). Typical particle sizes of these emulsion polymers are in the range from 100 to 500 nm, preferably from 200 to 400 nm.

A structure which has three layers or three phases, with a core and two shells, can be generated as follows. By way of example, an innermost (hard) shell may in essence be composed of methyl methacrylate, small proportions of comonomers, e.g. ethyl acrylate, and a proportion of crosslinking agent, e.g. allyl methacrylate. The middle (soft) shell may, for example, be composed of butyl acrylate and, where appropriate, styrene, whereas the outermost (hard) shell in essence mostly corresponds to the matrix polymer, thus bringing about compatibility and good linkage to the matrix. The polybutyl acrylates content in the impact modifier is decisive for impact resistance, and is preferably in the range from 20 to 40% by weight, particularly preferably in the range from 25 to 35% by weight.

Impact-modified Polymethacrylate Moulding Compositions

The impact modifier and matrix polymer can be mixed in the melt in an extruder to give impact-modified poly methacrylate moulding compositions. The material discharge is generally first chopped to give pellets. This can be further processed by means of extrusion or injection moulding to give mouldings, such as sheets or injection-moulded parts.

Notched Impact Strengths and Flowability in the Prior Art

Mouldings composed of commercially available impact-modified polymethacrylate moulding compositions have Charpy notched impact strengths NISs to ISO 179/1eA in the range from 3.0 to 5.0 kJ/m².

Commercially available impact-modified polymethacrylate moulding compositions have flowabilities MVR (230° C./3.8 kg) in the range from 0.4 to 8.1 cm³/10 min to ISO 1133. The flowability of impact-modified polymethacrylate moulding compositions is to be maximized in particular for injection-moulding processes. Polymethacrylate moulding compositions optimized for flowability achieve MVR values (230° C./3.8 kg, ISO 1133) in the region of at most about 10.0 cm³/10 min.

Two-phase Impact Modifiers According to EP 0 528 196 A1

It is preferable, particular for film production, but without restriction thereto, to use a matrix a) known in principle from EP 0 528 196 A1, which is a two-phase, impact-modified polymer composed of:

a1) from 10 to 95% by weight of a coherent hard phase whose glass transition temperature $T_{mg}$ is above 70° C., composed of a11) from 80 to 100% by weight (based on a1) of methyl methacrylate and a12) from 0 to 20% by weight of one or more other ethylenically unsaturated monomers capable of free-radical polymerization, and a2) from 90 to 5% by weight of a tough phase dispersed within the hard phase and having a glass transition temperature $T_{mg}$ below −10° C., composed of a21) from 50 to 99.5% by weight of a $C_1$-$C_{10}$-alkyl acrylate (based on a2)

a22) from 0.5 to 5% by weight of a crosslinking monomer having two or more ethylenically unsaturated radicals capable of free-radical polymerization, and a23) where appropriate, other ethylenically unsaturated monomers capable of free-radical polymerization, where at least 15% by weight of the hard phase a1) has covalent linking to the tough phase a2).

The two-phase impact modifier may be produced via a two-stage emulsion polymerization process in water, e.g. as described in DE-A 38 42 796. In the first stage, the tough phase a) is produced, and is composed of at least 50% by weight, preferably more than 80% by weight, of lower alkyl acrylates, the resultant glass transition temperature $T_{mg}$ of this phase being below −10° C. Crosslinking monomers a22) used are (meth)-acrylic esters of diols, e.g. ethylene glycol dimethacrylate or 1,4-butanediol dimethacrylate, aromatic compounds having two vinyl or allyl groups, e.g. divinylbenzene, or other crosslinking agents having two ethylenically unsaturated radicals capable of free-radical polymerization, e.g. allyl methacrylate, as graft-linking agents. By way of example of a crosslinking agent having three or more unsaturated groups capable of free-radical polymerization, e.g. allyl groups or (meth)acrylic groups, mention may be made of triallyl cyanurate, trimethylolpropane triacrylate and trimethylolpropane trimethacrylate, and also pentaerythritol tetraacrylate and pentaerythritol tetramethacrylate. U.S. Pat. No. 4,513,118 gives other examples here.

By way of example, the ethylenically unsaturated monomers mentioned under a23) and capable of free-radical polymerization may be acrylic or methacrylic acid, or else alkyl ethers thereof having from 1 to 20 carbon atoms, where these compounds have not been mentioned above, and where the alkyl radical may be linear, branched or cyclic. a23) may moreover encompass other aliphatic comonomers capable of free-radical polymerization and copolymerizable with the alkyl acrylates a21). However, this excludes significant proportions of aromatic comonomers, such as styrene, alpha-methylstyrene or vinyltoluene, because they lead to undesired properties of the moulding composition A—especially on weathering.

During production of the tough phase in the first stage, close attention has to be paid to adjustment of the particle size and its polydispersity. The particle size of the tough phase here is in essence dependent on the concentration of the emulsifier. The particle size can advantageously be controlled via the use of a seed latex. Use of emulsifier concentrations of from 0.15 to 1.0% by weight, based on the aqueous phase, gives particles whose median particle size (ponderal median) is below 130 nm, preferably below 70 nm, and whose particle size polydispersity factor $P_{80}$ is below 0.5 ($P_{80}$ being determined by integration of the particle size distribution determined via ultracentrifuge, where: $P_{80}=[(r_{90}-r_{10})/r_{50}]-1$ where $r_{10}$, $r_{50}$, $r_{90}$=median cumulative particle radius in which 10, 50, or 90% of the particle radii are below this value and 90, 50 or 10% of the particle radii are above this value), preferably below 0.2. This especially applies to anionic emulsifiers, such as the particularly preferred alkoxylated and sulphated paraffins. Examples of polymerization initiators used are from 0.01 to 0.5% by weight of alkali metal peroxodisulphate or of ammonium peroxodisulphate, based on the aqueous phase, when the polymerization is initiated at temperatures of from 20 to 100° C. It is preferable to use redox systems, e.g. a combination of from 0.01 to 0.05% by weight of organic hydroperoxide and from 0.05 to 0.15% by weight of sodium hydroxymethylsulphinate, at temperatures of from 20 to 80° C.

The hard phase a1), at least 15% by weight which has covalent bonding to the tough phase a2), has a glass transition temperature of at least 70° C. and can be composed exclusively of methyl methacrylate. Up to 20% by weight of one or more other ethylenically unsaturated monomers capable of free radical polymerization may be present as comonomers a12) in the hard phase, the amounts used of alkyl (meth) acrylates, preferably alkyl acrylates having from 1 to 4 carbon atoms, being such that the abovementioned glass transition temperature is achieved.

The second stage of the polymerization of the hard phase a1) likewise proceeds in emulsion, using the usual auxiliaries, such as those also used for polymerizing the tough phase a2).

In one preferred embodiment, the hard phase comprises low-molecular-weight and/or copolymerized UV absorbers in amounts of from 0.1 to 10% by weight, preferably from 0.5 to 5% by weight, based on A, as constituent of the comonomer component a12) in the hard phase. Examples which may be mentioned are the polymerizable UV absorbers as are, inter alia, described in U.S. Pat. No. 4,576,870 are 2-(2'-hydroxyphenyl)-5-methacryl-amidobenzotriazole or 2-hydroxy-4-methacryloxy-benzophenone. By way of example, low-molecular-weight UV absorbers may be derivatives of 2-hydroxybenzophenone or of 2-hydroxyphenylbenzotriazole, or may be phenyl salicylate. The molar mass of the low-molecular-weight UV absorbers is generally less than $2\times10^3$ (g/mol). Particular preference is given to UV absorbers which have low volatility at the processing temperature and which have homogeneous miscibility with the hard phase a1) of the polymer A.

The Matting Agent b)

The matting agent b) is a (meth)acrylate copolymer, which is prepared from the following monomers:

b1) from 50 to 95% by weight, preferably from 50 to 90% by weight, of methyl methacrylate b2) from 5 to 50% by weight, preferably from 10 to 50% by weight, of $C_1$-$C_6$-alkyl acrylates, in particular methyl acrylate, ethyl acrylate, propyl acrylate, butyl acrylate and/or hexyl acrylate b3) from 0.01 to less than 0.5% by weight, preferably from 0.05 to 0.49% by weight, in particular from 0.1 to 0.4% by weight, of a crosslinking monomer and/or graft-linking agent having two or more ethylenically unsaturated radicals capable of free-radical polymerization.

By way of example, crosslinking monomers b3) may be (meth)acrylic esters of diols, e.g. ethylene glycol dimethacrylate or 1,4-butanediol dimethacrylate, aromatic compounds having two vinyl or allyl groups, e.g. divinylbenzene, or other crosslinking agents having two ethylenically unsaturated radicals capable of fee-radical polymerization, e.g. allyl methacrylate, as graft-linking agent. Examples which may be mentioned as crosslinking agents having three or more unsaturated groups capable of free-radical polymerization, e.g. allyl groups or (meth)acrylic groups, are triallyl cyanurate, trimethylolpropane triacrylate, trimethylolpropane trimethacrylate and also pentaerythritol tetraacrylate and pentaerythritol tetramethacrylate.

b4) from 0 to 20% by weight, preferably from 0 to 5% by weight, of one or more other, non-crosslinking, ethylenically unsaturated monomers capable of free-radical polymerization, e.g. $C_1$-$C_4$-alkyl (meth)acrylates, such as methyl acrylate, ethyl acrylate, butyl methacrylate, isobutyl methacrylate or n-butyl methacrylate, or other monomers capable of vinylic polymerization, e.g. styrene. However, it is particularly preferable that less than 2% by weight of other monomers b4) are present, or none.

Constituents b1) and b2), and also, where appropriate, b3) and/or b4) give a total of 100% by weight.

The molar mass $M_w$ (weight average) of the matting agent can advantageously be at least 200 000 (g/mol), preferably at least 250 000 (g/mol). By way of example, the molar mass $M_w$ may be determined by gel permeation chromatography or by a light scattering method (see, for example, B. H. F. Mark et al., Encyclopaedia of Polymer Science and Engineering, 2nd Edition, Vol. 10, pp. 1 et seq., J. Wiley, 1989). As the proportion of crosslinking agent rises, the molar mass increases sharply. Whereas in the non-crosslinked state the molar mass can be determined easily and very precisely, as the degree of crosslinking rises precise determination becomes increasingly difficult. If the molar mass is extremely high, a rough estimate is mostly all that is possible. If two or more linear molecular chains are crosslinked with one another, the molar mass can rise almost without limit and finally become incapable of exact determination. However, it remains possible to establish whether the molar mass is above the stated values of at least 200 000 (g/mol), preferably at least 250 000 (g/mol). By way of example, this may be established via additional dissolution or extraction experiments with subsequent analysis of the constituents, e.g. gel permeation chromatography.

The glass transition temperature $T_{mg}$ of the matting agent is at least 20° C. Glass transition temperature here means in particular the midpoint temperature $T_{mg}$ to ISO 11357-2, 3.3.3. The measurement takes place without addition of plasticizer, at residual monomer contents (REMO) of less than 100 ppm, with a heating rate of 10° C./min and under nitrogen.

The matting agent b) can in particular be a copolymer composed of from 50 to 90% by weight, preferably from 60 to 80% by weight, of methyl methacrylate from 10 to 50% by weight, preferably from 20 to 40% by weight, of ethyl acrylate and/or butyl acrylate from 0.01 to less than 0.5% by weight, preferably from 0.1 to 0.4% by weight, of a crosslinking monomer and/or graft-linking agent having two or more ethylenically unsaturated radicals capable of free-radical polymerization, particularly preferably ethylene glycol dimethacrylate.

Preparation of the Matting Agent

The matting agent b) may, for example, be prepared by means of emulsion polymerization and, prior to incorporation into the matrix a), have a median particle size in the range from 100 nm to 10 µm, preferably from 1 to 5 µm. Laser extinction methods may be used to determine the particle size, and also the particle size distribution. For this, use may be made of a Galay-CIS from L.O.T. GmbH, the user manual for which gives the test method for determining particle size and particle size distrubution. The median particle size $V_{50}$ is the ponderal median, where the value for 50% by weight of particles is smaller than or identical with this value, and that for 50% by weight of these particles is greater than or identical with this value. Another method of determining the particle size, and also the particle size distribution, is analysis using an ultracentrifuge. In this method, the particle size and the particle size distribution can be determined from the sedimentation of the particles under the action of centrifugal force with the aid of the Stokes equation and the laws of Mie scattering (see, for example, B. H. F. Mark et al., Encyclopaedia of Polymer Science and Engineering, 2nd Edition, Vol. 17, J. Wiley, New York, 1989).

First, a batch or feed process is used to obtain a dispersion in a manner known per se, semicontinuously or else continuously, via aqueous emulsion polymerization (see in this connection, by way of example, DE 195 03 099 A1). The particle size may advantageously be controlled via the use of a seed latex. Free-radical polymerization of the monomers in the presence of an emulsifier takes place by means of water-soluble polymerization initiators which form free radicals, and which can form the radicals via thermal or redox processes. It is preferable to add a molecular weight regulator.

The matting agent b) is obtained from the dispersion via removal of the water by means of precipitation methods, freeze coagulation, spray drying or dewatering in a twin-screw extruder.

EP-A 0 683 028 describes a process for dewatering a two-phase liquid mixture composed of a thermoplastic melt and an aqueous phase in a counter-rotating twin-screw extruder. Here, the coagulation of the plastics latex can take place directly in the extruder under the action of shear in the coagulation zone at a temperature in the thermoplastic region of the plastic. The melt here is conveyed in partially filled screw channels and in at least one of these screw channels is subjected to back-pressure with formation of a steep and highly localized pressure gradient, to give a coherent melt cake. Gravity thus causes the water to flow downward ahead of the boundary of the melt cake in such a way that the melt cake is no longer in contact with a coherent water phase. When this process is used, the water content of an emulsion polymer whose initial water content is 55% by weight can be reduced, by way of example, to just 8% by weight of water. The residual amounts of volatile fractions can then be removed in a vented extruder via a vent zone for forward- or backward-oriented devolatilization. The pellets removed at the pelletizing die have a final residual moisture level of only about 0.06% by weight.

DE 197 18 597 C1 describes a process for dewatering a two-phase liquid mixture composed of a thermoplastic phase and an aqueous phase via coagulation of the two-phase liquid mixture in a first extruder, dewatering the coagulate in a twin-screw extruder with counter-rotating screws, using a dewatering zone, and removing volatile constituents via devolatilization, where the first extruder used comprises a single-screw extruder or a twin-screw extruder, and where the twin-screw extruder has corotating screws. Low residual polymer contents can be obtained in the region of about 0.35% by weight in the expressed water.

Moulding Composition

The inventive moulding composition can be obtained in a manner known per se via mixing of the matrix a) and of the matting agent b) in the molten state, for example in an extruder, preferably in a twin-screw extruder, discharging and cooling of the extrudate and then pelletizing of the material.

A particular feature of the inventive moulding composition is that a standard test specimen produced therefrom has roughness variables to DIN 4768 in the range $R_a$=from 0.1 to 0.5 µm, in particular from 0.2 to 0.4 µm, $R_z$=from 0.5 to 5.0 µm, in particular from 1.0 to 3.0 µm, e.g. from 2.0 to 2.5 µm, and $R_{max}$=from 0.5 to 5.0 µm, in particular from 1.0 to 4.0 µm, e.g. from 2.0 to 3.5 µm.

Mouldings

Mouldings can be produced in a manner known per se by means of extrusion or injection moulding from the inventive moulding composition.

The moulding may, by way of example, be a film, a flat sheet, a corrugated sheet, a multiple-web sandwich panel, a pipe, a rod or an injection-moulded part of any desired shape.

Use of Films

Films produced from the moulding composition may be used for co-lamination to another, optionally printed film material, for back-moulding with a plastics material, e.g. in the insert moulding process, for back-foaming with a plastics foam, e.g. with polyurethane foam, for extrusion lamination or for the lamination of any desired substrates, e.g. interior parts of motor vehicles or aircraft.

EXAMPLES

Abbreviations:
MMA=Methyl methacrylate
EA=Ethyl acrylate
EGDMA=Ethylene glycol dimethacrylate (crosslinking agent)
APS=Ammonium persulphate (initiator)
Emuls.=Sodium salt of C15 paraffin-sulphonate
$r_{50}$=Median particle radius determined via ultracentrifuge
Seed latex=Seed latex composed of isobutyl methacrylate, MMA and ethylene glycol dimethacrylate (47.5:47.5:5.0), with a solids content of 20% by weight and a particle radius $r_{50}$ of ~0.2 μm. The preparation process is described in EP 0 528 196 A1 (dispersion I of polymer B in the example given).
Matrix=Impact-resistant moulding composition composed of a thermoplastic matrix and of a tough phase dispersed therein. EP 0 528 196 A1 describes the preparation process (polymer A in the example given).

Preparation of the Dispersions

Deionized water forms an initial charge at 80° C. (vessel internal temperature control) in the polymerization vessel, with stirring, and is treated with the stated amount of seed latex and also with APS dissolved in water. After 5 min, the feed of the monomer emulsion with the stated composition is started and continues for 10 min. It is then interrupted for a subsequent 10 min (periodic feed). The remaining emulsion is then metered into the reactor within a period of 4 h at the same constant feed rate as for the first feed period. 120 min after the end of the feed, the mixture is cooled to 35° C. and filtered through DIN 100 sieve fabric.

|  | Example 1 | Example 2 | Example 3 |
|---|---|---|---|
| Initial charge |  |  |  |
| Deionized water | 1103 g | 1063 g | 1063 g |
| Seed latex | 240 g | 240 g | 240 g |
| APS | 1.16 g in 20 g of water | 1.16 g in 68 g of water | 1.16 g in 68 g of water |
| Feed |  |  |  |
| Water | 3617 g | 3617 g | 3617 g |
| Emulsifier | 2.92 g | 2.92 g | 2.92 g |
| APS | 7.04 g | 7.04 g | 7.04 g |
| MMA | 1831 g | 1627 g | 1423 g |
| EA | 204 g | 408 g | 612 g |
| EGDMA | 5.10 g | 5.10 g | 5.10 g |
| Analyses |  |  |  |
| Solids content: | 29.0% | 29.7% | 29.7% |
| coagulated material: | 0.1% | 0.11% | 0.06% |
| $R_{50}$ | 0.79 μm | 0.75 μm | 0.76 μm |

Properties

The dispersions are freeze-coagulated and dried. The coagulated material is then compounded with the impact-resistant moulding composition to give a 50% strength concentrate. This compounded material is again blended with the appropriate amount so that the amount of matting agent present is 15% by weight (dry-mixing of the pellets), and extruded to give films of thickness about 70 μm.

The table gives not only the roughness depth measurements but also haze values measured on the films. Because since the haze of specimens of thickness 70 μm derives mainly from surface scattering, the haze value is a good indicator of surface roughness.

|  | Comparative Example | Example 1 | Example 2 | Example 3 |
|---|---|---|---|---|
| Matting agent [% by weight] | None | 15 | 15 | 15 |
| Ethyl acrylate content [% by weight] | — | 10 | 20 | 30 |
| Average roughness value[a] $R_a$ [μm] | 0.10 | 0.12 | 0.21 | 0.39 |
| Average roughness depth[a] $R_z$ [μm] | 0.33 | 0.63 | 0.90 | 2.27 |
| Max. roughness depth[a] $R_{max}$ [μm] | 0.49 | 0.72 | 1.12 | 2.57 |
| Haze [%] ASTM D1003 | 1.12 | 17.2 | 28.3 | 39.9 |
| Visual assessment | Glossy | Slight matt effect | Moderate matt effect | Good matt effect |

[a]Roughness depth measurement: the measurements on the upper sides are given; the roughnesses on the lower sides are similar.

Both the roughness depth measurements and the haze measurement confirms the clear effect of the co-acrylate fraction in the matting agent. The roughness is seen to increase markedly with rising co-acrylate content for approximately the same particle radius and the same amount of material used.

The invention claimed is:

1. A moulding composition, comprising
   a) from 50 to 99.9% by weight of a matrix composed of a thermoplastic polymer and
   b) from 0.1 to 50% by weight of a matting agent in the form of a (meth)acrylate copolymer dispersed in the matrix, wherein the matting agent is a (meth)acrylate copolymer which has been prepared from the following monomers,
   b1) from 50 to 90% by weight of methyl methacrylate
   b2) from 10 to 50% by weight of ethyl acrylate and/or butyl acrylate
   b3) from 0.01 to 5% by weight of a crosslinking monomer and/or graft-linking agent having two or more ethylenically unsaturated radicals capable of free-radical polymerization, where the entirety of the constituents b1), b2), and b3) gives 100% by weight, and the glass transition temperature $T_{mg}$ of the matting agent is at least 20° C.

2. The moulding composition according to claim 1, wherein the matrix a) comprises a polymethyl methacrylate, an impact-modified polymethyl methacrylate, a polycarbonate, a polystyrene, an acrylate-styrene-acrylonitrile graft copolymer (ASA), a styrene-acrylonitrile (SAN), a polyester, a polyethylene terephthalate (PET), a glycol-modified polyethylene terephthalate (PETG), a polybutylene terephthalate plastic (PBT), a polyvinyl chloride plastic (PVC), a polyolefin plastic, a cycloolefin copolymer (COC), an acrylonitrile-butadiene-styrene (ABS) or a mixture or blend thereof.

3. The moulding composition according to claim 1, wherein the matrix a) is an impact-modified polymethyl methacrylate which comprises an impact modifier whose structure has two or three layers.

4. The moulding composition according to claim 1, wherein the matrix a) is an impact-modified polymer, comprised of:
 a1) from 10 to 95% by weight of a coherent hard phase whose glass transition temperature $T_{mg}$ is above 70° C., composed of
  a11) from 80 to 100% by weight (based on a1) of methyl methacrylate and
  a12) from 0 to 20% by weight of one or more other ethylenically unsaturated monomers capable of free-radical polymerization, and
 a2) from 90 to 5% by weight of a tough phase dispersed within the hard phase and having a glass transition temperature $T_{mg}$ below -10° C., comprised of
  a21) from 50 to 99.5% by weight of a $C_1$-$C_{10}$-alkyl acrylate (based on a2)
  a22) from 0.5 to 5% by weight of a crosslinking monomer having two or more ethylenically unsaturated radicals capable of free-radical polymerization, and
  a23) where appropriate, other ethylenically unsaturated monomers capable of free-radical polymerization,
 where at least 15% by weight of the hard phase a1) has covalent linking to the tough phase a2).

5. The moulding composition according to claim 1, wherein the crosslinking monomer in the matting agent b) is ethylene glycol dimethacrylate.

6. The moulding composition according to claim 1, wherein the matting agent b) has been prepared via emulsion polymerization, and, prior to incorporation into the matrix, has a median particle radius in the range from 100 nm to 10 µm.

7. The moulding composition according to claim 1, wherein a test specimen produced therefrom has roughness variables to DIN 4768 in the range $R_a$=from 0.1 to 0.5 µm, $R_z$=from 0.5 to 5.0 µm and $R_{max}$=from 0.5 to 5.0 µm.

8. A process for preparing a moulding composition as claimed in claim 1 by mixing of the matrix and of the matting agent in the molten state in an extruder, discharging and cooling of the extrudate and then pelletizing of the material.

9. A moulding composition produced by extrusion or injection moulding from a moulding composition according to claim 1.

10. A moulding according to claim 9, wherein the moulding is a film, a flat sheet, a corrugated sheet, a multiple-web sandwich panel, a pipe, a rod or an injection-moulded part.

11. The method of using a film produced from the moulding composition according to claim 1 for co-lamination to another, optionally printed film material, for back-moulding with a plastics material, for back-foaming with a plastics foam, for extrusion lamination or for the lamination of substrates.

12. The moulding composition according to claim 1, wherein the matting agent contains from 0.05 to 0.49% by weight of the crosslinking monomer and/or graft-linking agent having two or more ethylenically unsaturated radicals capable of free-radical polymerization.

13. The moulding composition according to claim 12, wherein the matting agent contains from 0.1 to 0.4% by weight of the crosslinking monomer and/or graft-linking agent having two or more ethylenically unsaturated radicals capable of free-radical polymerization.

* * * * *